/ 300

United States Patent
Nair et al.

(10) Patent No.: US 11,483,741 B2
(45) Date of Patent: Oct. 25, 2022

(54) AUTOMATED ROAMING SERVICE LEVEL AGREEMENTS BETWEEN NETWORK OPERATORS VIA SECURITY EDGE PROTECTION PROXIES IN A COMMUNICATION SYSTEM ENVIRONMENT

(71) Applicant: Nokia Technologies Oy, Espoo (FI)

(72) Inventors: Suresh Nair, Whippany, NJ (US); Anja Jerichow, Grafing bei München (DE); Nagendra S Bykampadi, Karnataka (IN)

(73) Assignee: Nokia Technologies Oy, Espoo (FI)

( * ) Notice: Subject to any disclaimer, the term of this patent is extended or adjusted under 35 U.S.C. 154(b) by 70 days.

(21) Appl. No.: 17/273,781

(22) PCT Filed: Aug. 9, 2019

(86) PCT No.: PCT/FI2019/050583
§ 371 (c)(1),
(2) Date: Mar. 5, 2021

(87) PCT Pub. No.: WO2020/049212
PCT Pub. Date: Mar. 12, 2020

(65) Prior Publication Data
US 2021/0321303 A1    Oct. 14, 2021

(30) Foreign Application Priority Data

Sep. 6, 2018    (IN) .............................. 201841033528

(51) Int. Cl.
*H04W 28/24*    (2009.01)
*H04W 12/03*    (2021.01)
(Continued)

(52) U.S. Cl.
CPC ......... *H04W 28/24* (2013.01); *H04L 63/0281* (2013.01); *H04W 8/12* (2013.01); *H04W 12/03* (2021.01); *H04W 84/042* (2013.01)

(58) Field of Classification Search
CPC ....... H04W 28/24; H04W 12/03; H04W 8/12; H04W 84/042; H04L 63/0281
(Continued)

(56) References Cited

U.S. PATENT DOCUMENTS

| 6,711,137 B1* | 3/2004 | Klassen ................ H04L 41/142 370/252 |
| 2008/0125120 A1* | 5/2008 | Gallagher ............. H04W 60/00 455/435.2 |

(Continued)

FOREIGN PATENT DOCUMENTS

| WO | 2008/136713 A1 | 11/2008 |
| WO | 2017/186297 A1 | 11/2017 |

OTHER PUBLICATIONS

Extended European Search Report received for corresponding European Patent Application No. 19857325.5, dated Apr. 4, 2022, 15 pages.

(Continued)

*Primary Examiner* — Nghi H Ly
(74) *Attorney, Agent, or Firm* — Nokia Technologies Oy

(57) ABSTRACT

Techniques for automated management of a service level agreement between a first communication network and a second communication network are provided. For example, one of the communication networks is a visited network while the other is a home network whereby the service level agreement is a roaming agreement. In one example, a message is received at a first communication network from a second communication network, wherein at least a portion of the message relates to the service level agreement between the first communication network and the second (Continued)

communication network. An automated verification of information in the message is performed at the first communication network to determine compliance with the service level agreement. The message receiving step is performed by a security edge protection proxy function of the first communication network and the automated verification performing step is performed by a service level agreement management function of the first communication network.

20 Claims, 4 Drawing Sheets

(51) Int. Cl.
*H04L 9/40* (2022.01)
*H04W 8/12* (2009.01)
*H04W 84/04* (2009.01)

(58) Field of Classification Search
USPC ............. 370/329, 328, 338, 341, 345, 350
See application file for complete search history.

(56) References Cited

U.S. PATENT DOCUMENTS

| | | | |
|---|---|---|---|
| 2011/0026397 A1* | 2/2011 | Saltsidis | H04L 41/0663 370/228 |
| 2012/0034916 A1 | 2/2012 | Hu et al. | |
| 2018/0176141 A1* | 6/2018 | Gupta | H04L 47/2433 |

OTHER PUBLICATIONS

"Analysis of different approaches for implementing SBA security over N32reference point", 3GPP TSG SA WG3 (Security) Meeting #90, S3-180028, Agenda: 7.2.13.2, TIM, Jan. 22-26, 2018, 5 pages.
"Introduction to Application layer security in SEPP", 3GPP TSG SA WG3 (Security) Meeting #90Bis, S3-180676, Agenda: 4.1.13.2, Nokia, Feb. 26-Mar. 2, 2018, 6 pages.
"LTE and EPC Roaming Guidelines", GSM Association, Official Document IR.88, Version 16.0, Jul. 5, 2017, pp. 1-90.
"3rd Generation Partnership Project; Technical Specification Group Services and System Aspects; Circuit Switched (CS) fallback in Evolved Packet System (EPS);Stage 2 (Release 15)", 3GPP TS 23.272, V15.0.0, Dec. 2017, pp. 1-103.
"3rd Generation Partnership Project; Technical Specification Group Radio Access Network; Evolved Universal Terrestrial Radio Access (E-UTRA) and NR; Multi-connectivity;Stage 2 (Release 15)", 3GPP TS 37.340, V15.2.0, Jun. 2018, pp. 1-55.
"3rd Generation Partnership Project; Technical Specification Group Core Network and Terminals; Numbering, addressing and identification (Release 15)", 3GPP TS 23.003, V15.4.0, Jun. 2018, pp. 1-120.
"3rd Generation Partnership Project; Technical Specification Group Services and System Aspects; System Architecture for the 5G System; Stage 2(Release 15)", 3GPP TS 23.501, V15.2.0, Jun. 2018, pp. 1-217.
"3rd Generation Partnership Project; Technical Specification Group Services and System Aspects;Security architecture and procedures for 5G system(Release 15)", 3GPP TS 33.501, V15.1.0, Jun. 2018, pp. 1-152.
"GSM Association Roaming Database, Structure and Updating Procedures", GSM Association, Official Document IR.21, Version 9.1, Jul. 5, 2013, pp. 1-155.
"DNS and ENUM Guidelines for Service Providers and GRX and IPX Providers", GSM Association, Official Document IR.67, Version 15.0, Jun. 29, 2018, pp. 1-71.
Bray, "The JavaScript Object Notation (JSON) Data Interchange Format", RFC 8259, Internet Engineering Task Force (IETF), Dec. 2017, pp. 1-16.
"IPX Definition", Official Document AA.51, Version 5.0, GSM Association, Jun. 15, 2020, pp. 1-20.
International Search Report and Written Opinion received for corresponding Patent Cooperation Treaty Application No. PCT/FI2019/050583, dated Nov. 25, 2019, 15 pages.
"User Plane Security for 5GC Roaming", SA WG2 Meeting #S2-130, S2-1900026, GSMA 5G Joint-Activity (5GJA), Jan. 21-25, 2019, 2 pages.

* cited by examiner

AUTOMATED ROAMING SERVICE LEVEL AGREEMENTS BETWEEN NETWORK OPERATORS VIA SECURITY EDGE PROTECTION PROXIES IN A COMMUNICATION SYSTEM ENVIRONMENT

RELATED APPLICATION

This application claims priority to PCT Application No. PCT/FI2019/050583, filed on Aug. 9, 2019, which claims priority to IN Application No. 201841033528, filed on Sep. 6, 2018, each of which is incorporated herein by reference in its entirety.

FIELD

The field relates generally to communication systems, and more particularly, but not exclusively, to service level agreement within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

Mobile devices that access LTE, 5G, or hybrid systems typically have a home network with which a given mobile device is considered a subscriber device. However, such subscriber devices may access one or more services through a visited network which is considered a roaming network since the given subscriber device may typically move between visited networks. Coordination of how the home network and a visited network interwork can be a significant challenge.

SUMMARY

Illustrative embodiments provide techniques for automated management of a service level agreement between a first communication network and a second communication network. For example, one of the communication networks is a visited network while the other is a home network.

In one illustrative embodiment, a method comprises the following steps. A message is received at a first communication network from a second communication network, wherein at least a portion of the message relates to a service level agreement between the first communication network and the second communication network. An automated verification of information in the message is performed at the first communication network to determine compliance with the service level agreement. The message receiving step is performed by a security edge protection proxy function of the first communication network and the automated verification performing step is performed by a service level agreement management function of the first communication network.

In another illustrative embodiment, a method comprises the following steps. A service level agreement between a first communication network and a second communication network is retrieved at a first communication network. A message is sent from the first communication network to the second communication network, wherein at least a portion of the message relates to the service level agreement between the first communication network and the second communication network, and wherein the message enables an automated verification of information in the message at the second communication network to determine compliance with the service level agreement. The service level agreement is retrieved from a service level agreement management function of the first communication network and the sending step is performed by a security edge protection proxy function of the first communication network.

One or more illustrative embodiments are implemented in a roaming scenario involving visited and home public land mobile networks.

Further illustrative embodiments are provided in the form of non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

DETAILED DESCRIPTION

Figure 1:
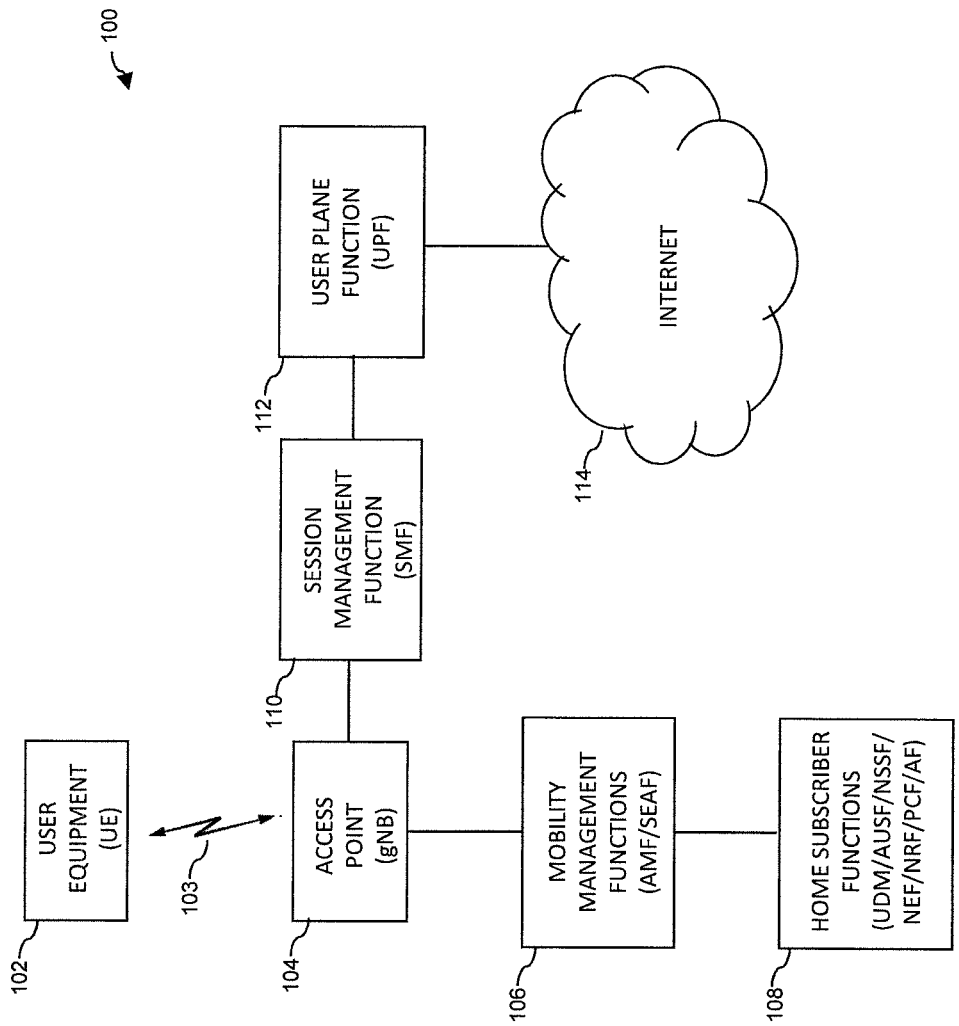
FIG. 1 illustrates a communication system with which one or more illustrative embodiments are implemented.

Embodiments will be illustrated herein in conjunction with example communication systems and associated techniques for providing automated service level agreement management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In an example communication system, user equipment (5G UE in a 5G network or, more broadly, a UE) such as a mobile terminal (subscriber device) communicates over an air interface with a base station or access point referred to as a gNB in a 5G network. The access point (e.g., gNB) is illustratively part of an access network of the communication system. For example, in a 5G network, the access network is referred to as a 5G System and is described in 5G Technical Specification (TS) 23.501, V15.2.0, entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet). TS 23.501 goes on to define a 5G Service-Based Architecture (SBA) which models services as network functions (NFs) that communicate with each other using representational state transfer application programming interfaces (Restful APIs). Furthermore, 5G Technical Specification (TS) 33.501, V15.1.0, entitled "Technical Specification Group Services and System Aspects; Security Architecture and Procedures for the 5G System," the disclosure of which is incorporated by reference herein in its entirety, further describes security management details associated with a 5G network.

In accordance with illustrative embodiments implemented in a 5G communication system environment, one or more 3GPP technical specifications (TS) and technical reports (TR) provide further explanation of user equipment and network elements/functions and/or operations that interact with one or more illustrative embodiments, e.g., the above-referenced 3GPP TS 23.501 and 3GPP TS 33.501. Other 3GPP TS/TR documents provide other conventional details that one of ordinary skill in the art will realize. However, while illustrative embodiments are well-suited for implementation associated with the above-mentioned 5G-related 3GPP standards, alternative embodiments are not necessarily intended to be limited to any particular standards.

Furthermore, illustrative embodiments will be explained herein in the context of the Open Systems Interconnection model (OSI model) which is a model that conceptually characterizes communication functions of a communication system such as, for example, a 5G network. The OSI model is typically conceptualized as a hierarchical stack with a given layer serving the layer above and being served by the layer below. Typically, the OSI model comprises seven layers with the top layer of the stack being the application layer (layer 7) followed by the presentation layer (layer 6), the session layer (layer 5), the transport layer (layer 4), the network layer (layer 3), the data link layer (layer 2), and the physical layer (layer 1). One of ordinary skill in the art will appreciate the functions and interworkings of the various layers and, thus, further details of each layer are not described herein. However, it is to be appreciated that while illustrative embodiments are well-suited for implementations that utilize an OSI model, alternative embodiments are not necessarily limited to any particular communication function model.

Illustrative embodiments are related to automated service level agreement management associated with the Service-Based Architecture (SBA) for 5G networks. Prior to describing such illustrative embodiments, a general description of main components of a 5G network will be described below in the context of FIG. 1.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements are used in other embodiments to implement some or all of the main functions represented. Also, it is to be understood that not all functions of a 5G network are depicted in FIG. 1. Rather, functions that facilitate an explanation of illustrative embodiments are represented. Subsequent figures depict some additional elements and/or functions.

Accordingly, as shown, communication system 100 comprises user equipment (UE) 102 that communicates via an air interface 103 with an access point (gNB) 104. The UE 102 in some embodiments is a mobile station, and such a mobile station may comprise, by way of example, a mobile telephone, a computer, or any other type of communication device. The term "user equipment" as used herein is therefore intended to be construed broadly, so as to encompass a variety of different types of devices such as, for example, devices referred to as mobile devices, mobile stations, subscriber devices, subscriber stations or, more generally, communication devices. Examples include, but are not limited to, a combination of a data card inserted in a laptop or other equipment such as a smart phone or other cellular device. In some embodiments, mobile devices include IoT devices. The term user equipment is also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores the permanent subscription identifier and its related key, which are used to identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as a Subscription Concealed Identifier (SUCI).

The access point 104 is illustratively part of an access network of the communication system 100. Such an access network comprises, for example, a 5G System having a plurality of base stations and one or more associated radio network control functions. The base stations and radio network control functions in some embodiments are logically separate entities, but in some embodiments are implemented in the same physical network element, such as, for example, a base station router or femto cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) in some embodiments is also implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF is also referred to herein, more generally, as an access and mobility management entity.

The AMF 106 in this illustrative embodiment is operatively coupled to home subscriber functions 108, i.e., one or more functions that are resident in the home network of the subscriber. Recall that UE 102 has a home network with which it is considered a subscriber, but accesses one or more services (available through a data network, e.g., Internet 114) through a visited network which is considered a roaming network since UE 102 may move between visited networks. In FIG. 1, AMF 106 is considered part of the visited network currently being accessed by UE 102. Coordination of how the home network and a visited network interwork can be a significant challenge. One such challenge, for which illustrative embodiments described herein will focus, is service level agreement management. Problems that exist with management of service level agreements and automated solutions according to illustrative embodiments will be described in detail below. "Service level agreement" or SLA is generally defined as an agreement between two parties as to the level of service to be provided by one or both parties. In illustrative embodiments, SLA is between two network (or telecom) operators: a network operator of a home network of a subscriber; and a network operator of a network which the subscriber is accessing (visited network). Such SLAs are sometimes referred to as roaming SLAs.

Returning to FIG. 1, some of the home network functions include the Unified Data Management (UDM) function, as well as an Authentication Server Function (AUSF). The AUSF and UDM (separately or collectively) are also referred to herein, more generally, as an authentication entity. In addition, home subscriber functions include, but are not limited to, Network Slice Selection Function (NSSF), Network Exposure Function (NEF), Network Function Repository Function (NRF, also sometimes referred to as a Network Repository Function), Policy Control Function (PCF), and Application Function (AF).

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. As is known in 5G and other communication networks, the user plane (UP) or data plane carries network user traffic while the control plane (CP) carries signaling traffic. SMF 110 supports functionalities relating to UP subscriber sessions, e.g., establishment, modification and release of PDU sessions. UPF 112 supports functionalities to facilitate UP operations, e.g., packet routing and forwarding, interconnection to the data network (e.g., 114 in FIG. 1), policy enforcement, and data buffering.

It is to be appreciated that FIG. 1 is a simplified illustration in that not all communication links and connections between NFs and other system elements are illustrated in FIG. 1. One ordinarily skilled in the art given the various 3GPP TSs/TRs will appreciate the various links and connections not expressly shown or that may otherwise be generalized in FIG. 1.

Further typical operations and functions of certain network elements are not described herein in detail when they are not the focus of illustrative embodiments but can be found in appropriate 3GPP 5G documentation. It is to be appreciated that the particular arrangement of system elements in FIG. 1 is an example only, and other types and arrangements of additional or alternative elements can be used to implement a communication system in other embodiments. For example, in other embodiments, the system 100 comprises other elements/functions not expressly shown herein. Also, although only single elements/functions are shown in the FIG. 1 embodiment, this is for simplicity and clarity of illustration only. A given alternative embodiment may include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104. NFs can also access services of other NFs.

As mentioned above, coordination of service level agreement management between a home network and a visited network can be a significant challenge. Currently, service level agreements (SLAs) between two telecom operators (e.g., between a mobile network operator (MNO) of a home network and an MNO of a visited network) are based on the Groupe Speciale Mobile (or Global System Mobile Communication) Association (GSMA) guidelines as, for example, specified in GSMA Permanent Reference Document (PRD) IR.88, version 16.0, dated Jul. 5, 2017, the disclosure of which is incorporated by reference herein in its entirety. GSMA PRD IR.21, version 9.1, dated Jul. 5, 2013, and GSMA PRD IR.67, version 15.0, Jun. 29, 2018, the disclosures of which are incorporated by reference herein in their entireties, are also under use by telecom operators to make roaming agreements.

Note that the PRD IR.88 guidelines are directed to an LTE (4G) communication system. Though various versions of PRD IR.88, as well as the other PRDs mentioned above, have existed for some time, SLAs are still typically implemented as paper agreements. A main problem with such an approach is that manually setting up roaming SLAs (e.g., SLA between a visited network and a home network that defines contractual terms of interworking and other functions) between a variety of MNOs is very cumbersome.

Figure 2:
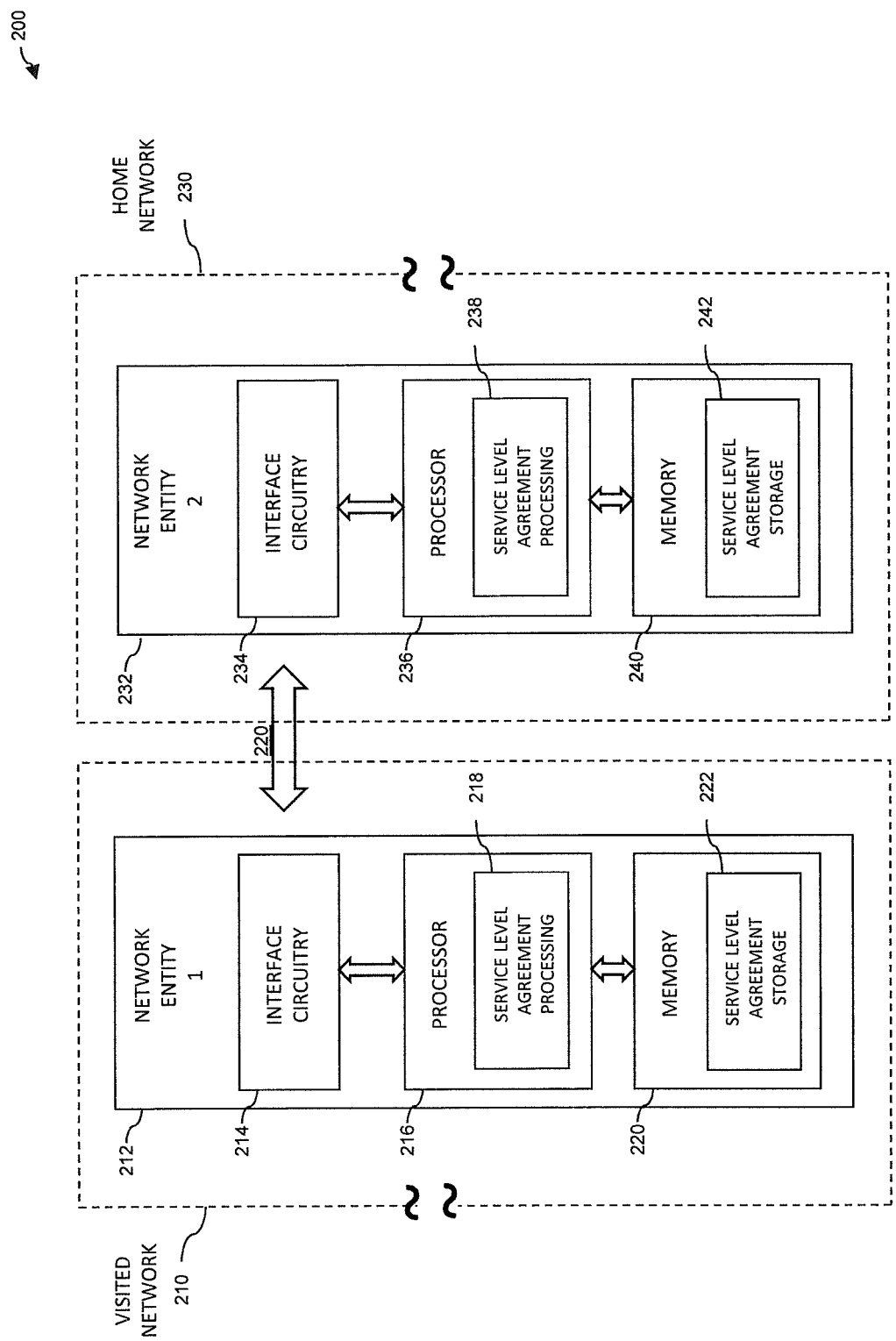
FIG. 2 illustrates network entities for providing automated service level agreement management, according to an illustrative embodiment.
Figure 3:
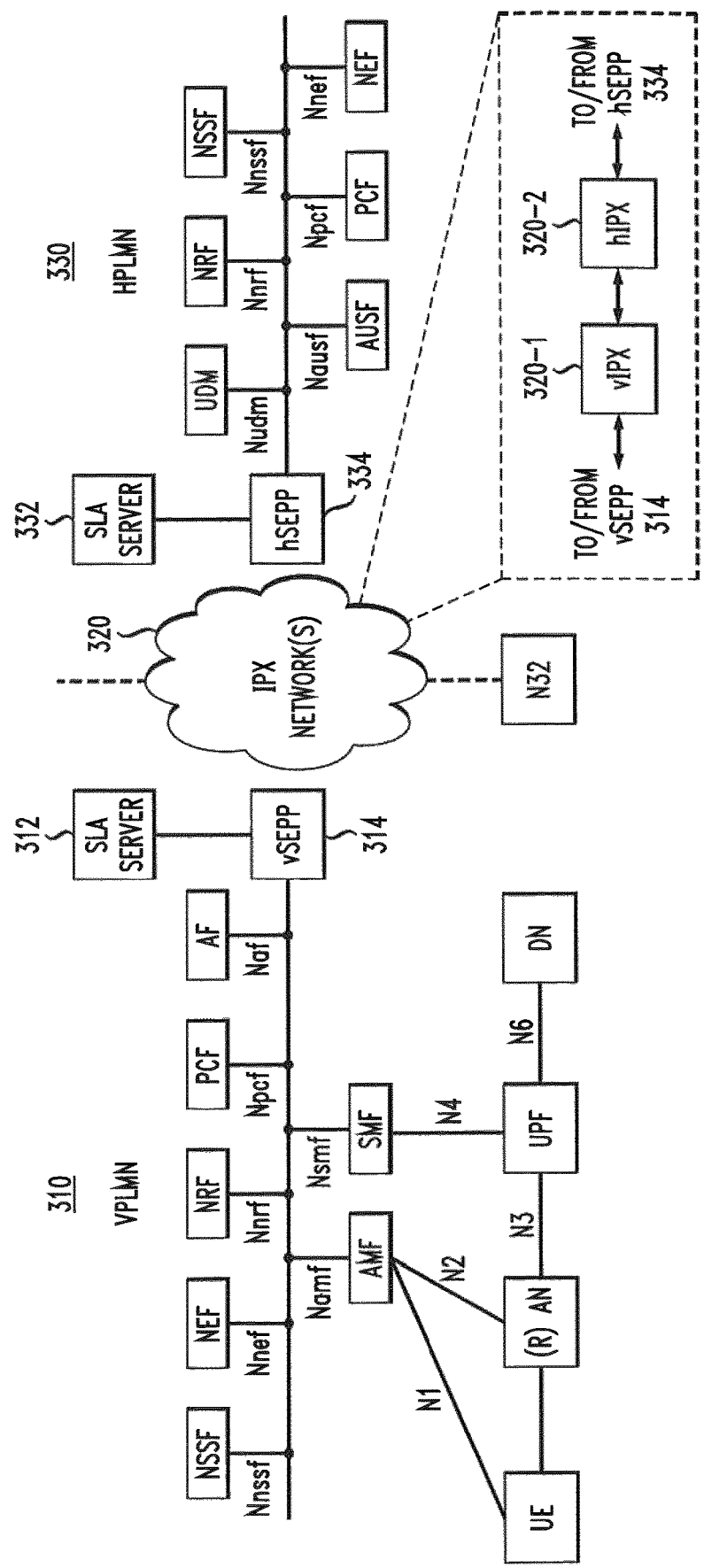
FIG. 3 illustrates a communication system architecture with automated service level agreement management, according to an illustrative embodiment.
Figure 4:
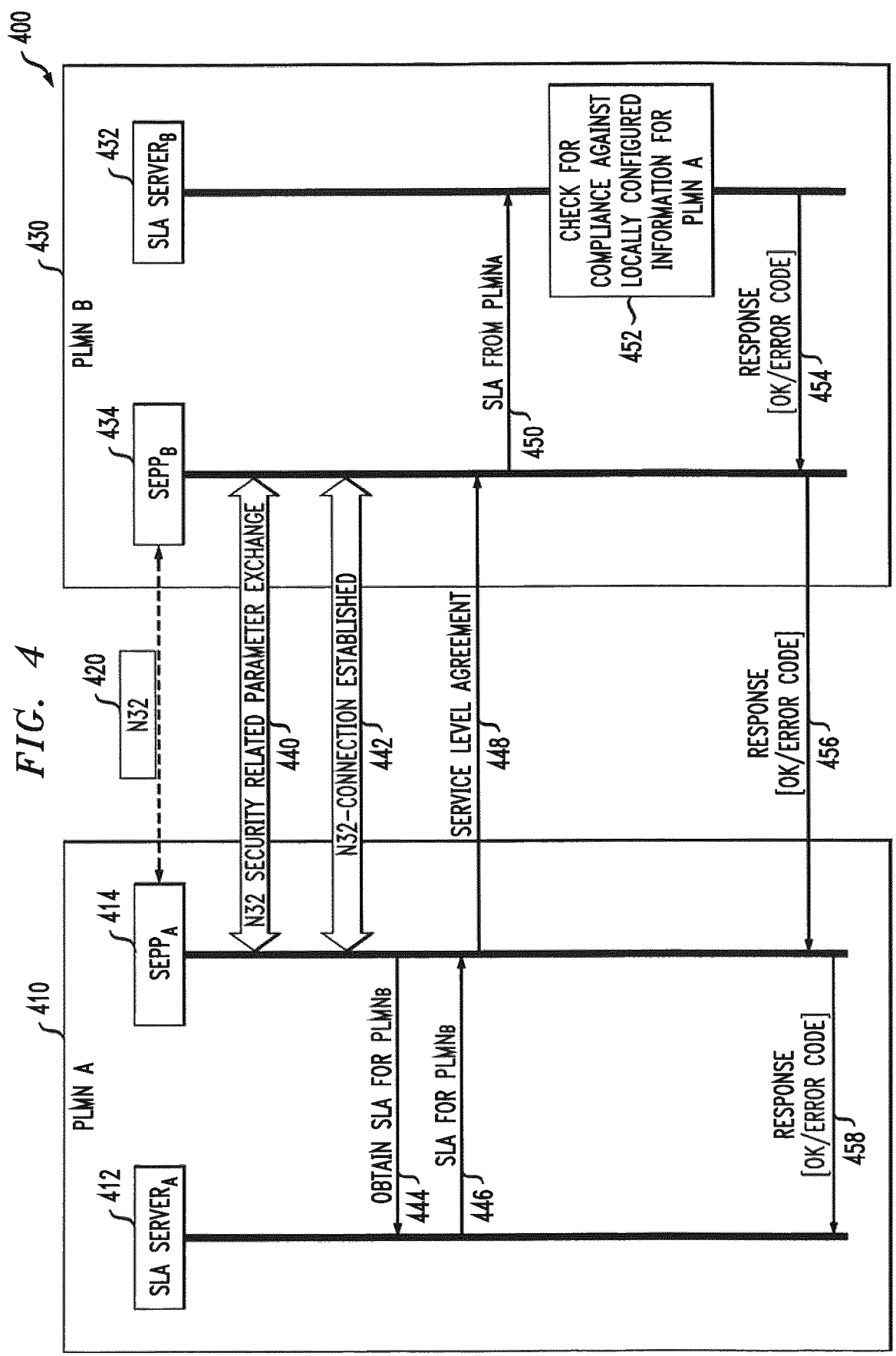
FIG. 4 illustrates a message flow for automated service level agreement management, according to an illustrative embodiment.

Illustrative embodiments address these and other drawbacks by automating management (e.g., negotiation and/or enforcement) of a roaming SLA between two network operators by utilizing a Security Edge Protection Proxy (SEPP) introduced in the 5G network architecture. As will be further explained below, a SEPP is the entity residing at the perimeter of a network (e.g., one at the edge of a visited network and one at the edge of a home network) used to protect the network from outside traffic and additionally to implement transport layer security (TLS) and application layer security (ALS) for all the data and signalling exchanged between two inter-network network functions at the service layer. In some embodiments, PRD IR.88 guidelines and agreements for services can be dynamically negotiated and applied between two operator networks via the SEPPs of the two networks. FIGS. 2-4 will depict further details of the illustrative solutions.

While embodiments are not limited to SLA negotiation and enforcement according to PRD IR.88, some relevant details of PRD IR.88 are now described for context. As mentioned, PRD IR.88 defines LTE roaming, and LTE networks are expected to co-exist along with 5G networks. Thus, while illustrative solutions are described herein from the perspective of automated SLA management in roaming scenarios for 5G networks, scenarios where one of the networks is an LTE network and the other is a 5G network are contemplated as well.

PRD IR.88 defines LTE and Evolved Packet Core (EPC) roaming guidelines required for interwork and definition of mobile network capabilities when subscribers roam. Consequently, PRD IR.88 provides technical roaming guidelines for Voice-over-LTE (VoLTE) using the local breakout (LBO) option in the LTE roaming architecture. In the LBO roaming scenario, Internet Protocol (IP) Multimedia Subsystem (IMS) traffic is broken out from the packet data network gateway (P-GW) in the visited network traversing the IMS network-to-network interface (IMS-NNI) to the functions in the home network and utilizes optimized media routing methods defined in 3GPP standards.

PRD IR.88 also covers relocation to circuit switched (CS) voice and short message system (SMS) services using CS fall back (CSFB) as defined in 3GPP TS 23.272, the disclosure of which is incorporated by reference herein in its entirety, when VoLTE or SMS-over-IP (SMSoIP) is not available. Furthermore, PRD IR.88 specifies capabilities to facilitate roaming for IMS-based services, such as VoLTE, and based on the IMS access point name (APN).

In PRD IR.88, the interconnection between two network operators can be implemented as one of three models, i.e., three IPX connectivity options defined in GSMA AA.51 [50], "IPX Definition and Releases," version 1.0, the disclosure of which is incorporated by reference herein in its entirety. Note that IPX or IP exchange is a telecommunications interconnection model for the exchange of IP-based traffic between subscribers of separate mobile and fixed operators as well as other types of service providers via IMS-NNI. The three IPX connectivity options (models) include:

(i) Bilateral Transport only connectivity with direct peer connections between Diameter Edge Agents (DEAs) and no IPX Diameter Agent in between;

(ii) Bilateral Service Transit mode with public mobile network (PMN) interconnection provided by IPX Diameter Agents; and Multi-lateral Service Transit mode with PMN interconnection provided by IPX Diameter Agents.

Automated SLA management according to illustrative embodiments supports each of these three IPX options/models. Additionally or alternatively, illustrative embodiments support:

(i) Notification of ME Identity: If the MME detects an ME identity change from the UE, then home subscriber server (HSS) needs to be informed;

(ii) S8 home routed procedures;

(iii) Gy interface enables online control of data usage by the Online Charging System (OCS) in the HPMN using preconfigured (static or standardized) policies in the VPMN.

(iv) Evolved Universal Terrestrial Radio Access-New Radio (E-UTRA-NR) Dual Connectivity (DC) with EPC E-UTRA-NR Dual Connectivity (EN-DC) as specified in section 4.1.2 of 3GPP Release 15 TS 37.340, the disclosure of which is incorporated by reference herein in its entirety.

It is realized herein that there is no existing mechanism to enforce the paper agreements and operating parameters between the network elements in an automated and dynamic fashion to operational parameters between network elements.

However, as mentioned above in accordance with the 5G network architecture, 3GPP has adopted an SBA approach and introduced the SEPP element to protect the visited public land mobile network (VPLMN) elements and home public land mobile network (HPLMN) elements when communicating over the N32 interface and to facilitate UE authentication while roaming.

Illustrative embodiments utilize the SEPP and service-based application programming interfaces (APIs) to provide automated negotiation and dynamic implementation of roaming SLAs between two network operators, which is not possible with existing approaches.

In accordance with the "roam-like home" policy from the European Union (EU), all EU operators are forced to support inter-PLMN roaming with the same resource and service privileges to users as in their home networks. This can become a huge burden on both HPLMN and VPLMN, unless they have very efficient tools to manage this effectively. Illustrative embodiments provide such automated SLA management tools as will now be explained in the context of FIGS. 2-4.

FIG. 2 is a block diagram of network entities for providing automated SLA management in an illustrative embodiment. As shown, system architecture 200 is shown comprising part of a visited network 210 coupled via a network interface 220 to part of a home network 230. The visited network 210 comprises a first network entity 212 (network entity 1) while the home network 230 comprises a second network entity 232 (network entity 2). Each network entity depicted in FIG. 2 may be considered a SEPP element/function with an automated SLA management element/function incorporated therein in some embodiments, or a combination of separate SEPP and automated SLA management elements/functions in other embodiments. In yet further embodiments that comprise separate SEPP and automated SLA management elements/functions, portions of the automated SLA management functionalities are incorporated in the SEPP element/function while other portions of the automated SLA management functionalities are part of the automated SLA management element/function. Other arrangements of the SEPP function and the automated SLA management function are within the scope of embodiments described herein. Also, while the SEPP function and the automated SLA management function are contemplated as being in the same network entity in the FIG. 2 embodiment, the SEPP function and the automated SLA management function are implemented in different network entities in alternative embodiments.

The first network entity 212 comprises a processor 216 coupled to a memory 220 and interface circuitry 214. The processor 216 of the network entity 212 includes a service level agreement processing module 218 that in some embodiments is implemented at least in part in the form of software executed by the processor 216. The processing module 216 performs automated service level agreement management functionalities described in conjunction with subsequent figures and otherwise herein. The memory 220 of the network entity 212 includes a service level agreement storage module 222 that stores data generated or otherwise used during automated service level agreement management operations.

The second network entity 232 comprises a processor 236 coupled to a memory 240 and interface circuitry 234. The processor 236 of the network entity 232 includes a service level agreement processing module 238 that in some embodiments is implemented at least in part in the form of software executed by the processor 236. The processing module 236 performs automated service level agreement management functionalities described in conjunction with subsequent figures and otherwise herein. The memory 240 of the network entity 232 includes a service level agreement storage module 242 that stores data generated or otherwise used during automated service level agreement management operations.

The processors 216 and 236 of the respective network entities 212 and 232 in some embodiments comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware are used in implementing alternative embodiments.

The memories 220 and 240 of the respective network entities 212 and 232 in some embodiments store one or more software programs that are executed by the respective processors 216 and 236 to implement at least a portion of the functionality described herein. For example, automated service level agreement management operations and other functionalities as described in conjunction with subsequent figures and otherwise herein are implemented in embodiments using software code executed by processors 216 and 236.

A given one of the memories 220 or 240 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 220 or 240 in some embodiments more particularly comprises, for example, an electronic random-access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 214 and 234 of the respective network entities 212 and 232 illustratively comprise transceivers or other communication hardware or firmware that allows the associated system elements to communicate with one another in the manner described herein.

It is apparent from FIG. 2 that network entity 212 is configured for communication with network entity 232 and vice-versa via their respective interface circuitries 214 and 234. This communication involves network entity 212 sending data to the network entity 232, and the network entity 232 sending data to the network entity 212. However, in alternative embodiments, other network elements may be operatively coupled between, as well as to, the network entities 212 and 232. The term "data" as used herein is intended to be construed broadly, so as to encompass any type of information that may be sent between network entities (as well as between user equipment and a core network) including, but not limited to, service level agreement data, messages, tokens, identifiers, keys, indicators, user data, control data, etc.

Thus, in one illustrative embodiment, network entity 212 is an "SLA server" of a visited network and network entity 232 is an "SLA server" of a home network that communicate through respective SEPP entities, as will be further explained below in the context of FIGS. 3 and 4. However, in alternative embodiments, the SLA server and SEPP functions for a given communication network (home or visited) are combined in the same network entity.

It is to be appreciated that the particular arrangement of components shown in FIG. 2 is an example only, and numerous alternative configurations are used in other embodiments. For example, any given network entity can be configured to incorporate additional or alternative components and to support other communication protocols.

Other system elements such as UE 102, gNB 104, or any of the network elements/functions depicted in FIG. 1 may each also be configured to include components such as a processor, memory and network interface. These elements need not be implemented on separate stand-alone processing platforms, but could instead, for example, represent different functional portions of a single common processing platform.

FIG. 3 illustrates a communication system architecture with automated service level agreement management, according to an illustrative embodiment. More particularly, FIG. 3 depicts a 5G architecture 300 in a configuration comprising a visited public land mobile network (VPLMN) 310 operatively coupled via an intermediate Internetwork Packet Exchange (IPX) network 320 to a home public land mobile network (HPLMN) 330. FIG. 3 also illustrates the presence of a Security Edge Protection Proxy (SEPP) at the edge of each PLMN, i.e., vSEPP 314 in VPLMN 310 and hSEPP 334 in HPLMN 330. Furthermore, VPLMN 310 comprises an SLA server 312 operatively coupled to vSEPP 314, while HPLMN 330 comprises an SLA server 332 operatively coupled to hSEPP 334. As will be further explained below, SLA servers 312 and 332 automatically manage one or more SLAs between VPLMN 310 and HPLMN 330. An SLA server is one example of an automated SLA management function.

Note that there can be more than one IPX network operatively coupled between VPLMN 310 and HPLMN 330. For example, in the exploded view of IPX network 320 (denoted by the dashed outline box in FIG. 3), there are two IPX networks shown. vIPX 320-1 is the trusted IPX network associated with vSEPP 314, while hIPX 320-2 is the trusted IPX network associated with hSEPP 334.

It is to be appreciated that the various network functions shown in the VPLMN 310 and the HPLMN 330 are known and described in detail in various 5G specifications such as, but not limited to, the above-referenced TS 23.501 and TS 33.501.

As mentioned above, in 5G, SBA is introduced to model services as network functions (NFs) that communicate with each other using RESTful application programming interfaces (Representational State Transfer APIs). In the scenario where the two communicating NFs are in two different PLMNs (e.g., VPLMN 310 and HPLMN 330), communication happens over a roaming inter-network interface (N32) between the two participating PLMNs. For example, SLA server 312 and SLA server 332 are configured to communicate with each other (via SEPPs 314 and 334) using one or more Restful APIs.

To protect NF specific content in the messages that are sent over the roaming inter-network interface, 5G introduces the SEPP as the entity residing at the perimeter of the PLMN network to protect the PLMN from outside traffic and additionally to implement transport layer security (TLS) and application layer security (ALS) for all the data and signaling exchanged between two inter-network network functions at the service layer. For example, the SEPP performs security management functions on information elements (IE) in HyperText Transport Protocol (HTTP) messages before the messages are sent externally over the roaming N32 interface. The protected HTTP messages are referred to as N32 messages. Protection such as ALS involves protecting information sent in various parts of the HTTP message including, but not limited to, HTTP Request/Response Line, HTTP header and HTTP Payload. However, some parts of this message may need to be modified by intermediaries (e.g., network provider of IPX 320 as shown in FIG. 3) between the two SEPPs.

Thus, in 5G SBA, the PLMN operator deploys a SEPP at the edge of its network to interoperate and obtain services from network functions in its roaming partner networks. The SEPP interfaces with one or more other SEPPs in one or more other networks over the N32 interface. As an edge proxy, the SEPP implements ALS as mentioned above to protect HTTP messages exchanged between a network function in its network and another network function in the roaming partner network.

While two NFs can be in different PLMNs as FIG. 3 illustrates, some NFs in the same PLMN also have a need to communicate. In either scenario (inter-PLMN communication or intra-PLMN communication), the SBA communication model includes security methods that enable an "NF service consumer" (service client) to be authenticated and authorized to access a service provided by or otherwise associated with an "NF service producer" (service server). One of the supported authorization methods in the above-referenced 3GPP TS 33.501 (Release 15) is based on the OAuth 2.0 access token methodology. In a 5G system, the following model is adopted when OAuth 2.0 is used: (i) the NRF is the OAuth 2.0 authorization server; (ii) the NF service consumer is the OAuth 2.0 client; and (iii) the NF service producer is the OAuth 2.0 resource server.

The NF service consumer (client) discovers the NF service producer (resource server) via the NRF, and then obtains an access token to present to the NF service producer when invoking the service API request.

Given the concepts described above, illustrative embodiments that provide automated SLA management between two network operators will now be further described. More particularly, illustrative embodiments, as depicted in FIG. 3, use the SEPP to negotiate and implement the SLA parameters between two operator networks. While FIG. 3 depicts an SLA server as a separate server attached to a SEPP, the SLA server can be additional functionality of the SEPP in alternative embodiments.

In one or more illustrative embodiments, SLA servers 312 and 332 facilitate exchange of the procedures and parameters between the two PLMNs. By way of example only, in support for technical requirements and recommendations for interfaces, such procedures and parameters comprise:

(i) inter-PLMN IP backbone network requirements;

(ii) Stream Control Transmission Protocol (SCTP) and parameters to be used;

(iii) Diameter Agents and Diameter transport parameters;

(iv) Notification ME identity (IMEI SV)

(v) Quality-of-Service (QoS) for Diameter messages (vi) In an LTE system, serving gateway (SGW) selection by the MME/SGSN at initial attach or PDN connection establishment procedure. This occurs in the VPMN or the HPMN (non-roaming scenarios) using the Straightforward Name Authority Pointer (S-NAPTR) procedure with: "Service Parameters"={desired reference point, desired protocol}, "Application-Unique String"=Tracking Area Identity Fully Qualified Domain Name (TAI FQDN) as per 3GPP TS 23.003, the disclosure of which is incorporated by reference herein in its entirety.

(vii) Chain of trust certificates showing an end PLMN entity certificate, e.g., {PLMN Operator Name, PLMN Operator Public key, Issuer's name, Issuer's signature}, a middle entity certificate {Owner entity (CA's) Name, Owner entity Public key, Issuer's (Root CA) name, Issuer's signature} along with a root certificate {Root CA's name, Root CA's Public key, Root CA's signature}.

(viii) Information associated with IP roaming and IP interworking towards a GPRS Roaming Exchange (GRX) provider, such as list(s) of domain name system (DNS) server IP addresses/names (primary and secondary), IP address range(s), autonomous system (AS) number, etc., of the PMN.

While automating SLA using SEPP, in some embodiments, parameter negotiations are executed using one or more protocols such as, but not limited to, eXtensible Markup Language (XML) or JavaScript Object Notation (JSON). In such embodiments, legacy Diameter attribute value pairs (AVPs) are carried over XML/JSON.

A wide variety of benefits are realized by the automation of roaming SLAs in accordance with illustrative embodiments. For example, some benefits include:

i) Secured dynamic negotiation of roaming policies between two operators.

ii) Online monitoring of roaming enables analytics of inbound and outbound UEs and resources currently being consumed. This functionality enables provisioning of resources according to roaming agreements.

iii) Conserving resource usage according to the SLAs enables the operators to reduce costs in roaming scenarios, e.g., typically operators lose money if VPLMNs over provision resources for roaming UEs for more data or more time.

iv) Enable operators to offer targeted roaming packages to users based on device capability, e.g., high-end smart phones are offered attractive data packages, whereas 2G/3G devices need only limited data.

v) Targeted roaming agreements for special events and short time packages are possible between operators.

In some embodiments, automated SLA management comprises defining profiles/policies in the form of XML-schemes. In such embodiments, SLA servers 312 and 332 are configured to automatically evaluate the XML-schemes. A set of pre-configured profiles is useful to limit the number of options. For example, assume SLA server 332 contacts SLA server 312 after an initial handshake between SEPP 314 and SEPP 334. Assume that SLA server 332 has set preferences as to what to except from any SLA server of a visited network, e.g., SLA server 312. SLA server 332 checks whether or not preferences match with the provided profile of SLA server 312. A resolution mechanism is used if there is no match, e.g., in one embodiment, the fall back is manual checking. One advantage of such automation is that the SLA agreed upon between SLA server 312 and SLA server 332 is checked every time either one contacts the other. When pre-configured profiles are used, in some embodiments, the check comprises comparing a single digit. The SEPP involves the SLA server, which is configured to evaluate/compare the profile configuration.

FIG. 4 illustrates a message flow 400 for automated service level agreement management, according to an illustrative embodiment. As shown, PLMN A 410 (visited network) comprises SLA server 412 operatively coupled to SEPP 414. PLMN A is operatively coupled via an N32 interface 420 to PLMN B 430 (home network). PLMN B 430 comprises SEPP 434 operatively coupled to SLA server 432. Note that the SLA server is a logical function that may be co-located with the SEPP or part of the SEPP.

In accordance with the illustrative message flow 400, an initial handshake is performed between SEPP 414 and SEPP 434 to exchange required parameters (440) for implementing security on the N32 interface during establishment (442).

It is assumed that one of the SEPPs initiates verification of an SLA with the peer SEPP in another PLMN. In this example, it is assumed that SEPP 434 initiates verification of an SLA with SEPP 414. SEPP 434 obtains the SLA for the partner PLMN 410 from its local SLA server 412 as follows.

In step 444, SEPP 414 sends a message to SLA server 412 requesting that the subject SLA be sent to PLMN B 430.

In step 446, SLA server 412 provides the SLA to SEPP 414.

In step 448, SEPP 414 sends the SLA over the N32 interface 420 to SEPP 434.

In step 450, SEPP 434 provides the SLA to SLA server 432 for a verification and compliance check.

In step 452, SLA server 432 checks its locally configured database and verifies that the SLA is configured for PLMN A 410 and that parameters of the obtained SLA match parameters that are locally stored in PLMN B 430. In some embodiments, verification is performed cryptographically by verifying the hash of the SLA against what is configured. In some embodiments, SEPP 414 sends a hash of the SLA to SEPP 434 over N32 interface 420 rather than sending the full SLA.

Results of the verification and compliance check are conveyed from PLMN B 430 back to PLMN A 410 over N32 interface 420. For example, in step 454, SLA server 432 provides a response to SEPP 434. In step 456, SEPP 434 sends the response to SEPP 414. In step 458, SEPP 414 provides the response to SLA server 412.

Depending on the results, manual intervention by network operator administrators may be required for synchronising the SLA between the two PLMNs.

In one or more illustrative embodiments, SLAs are exchanged across the N32 interface in a standardized format representing the SLA. In one embodiment, a standardized XML format is used to represent the SLA. Other embodiments comprise representing the SLA as a JSON document, e.g., see Internet Engineering Task Force (IETF) Request for Comments (RFC) 8259 "The JavaScript Object Notation (JSON) Data Interchange Format," December 2017, the disclosure of which is incorporated by reference herein in its entirety.

In one or more illustrative embodiments, a default SLA profile with all common parameters included in an SLA is provided. An example profile for subscriber roaming comprises:

```
{
  Roaming duration: day/week etc.
  Data Usage: Unlimited/Max 1GB,
  Incoming Calls: Allowed/Not allowed
  Outgoing calls: Allowed/Not Allowed
  SMS/Text: Allowed/Not allowed
  Roaming charges:
  {
    Data (per MB):
    Voice (per minute):
    SMS (per SMS)
  }
}
```

The particular processing operations and other system functionality described in conjunction with the message flow diagram of FIG. 4 are presented by way of illustrative example only, and should not be construed as limiting the scope of the disclosure in any way. Alternative embodiments can use other types of processing operations and messaging protocols. For example, the ordering of the steps may be varied in other embodiments, or certain steps may be performed at least in part concurrently with one another rather than serially. Also, one or more of the steps may be repeated periodically, or multiple instances of the methods can be performed in parallel with one another.

It should therefore again be emphasized that the various embodiments described herein are presented by way of illustrative example only and should not be construed as limiting the scope of the claims. For example, alternative embodiments can utilize different communication system configurations, user equipment configurations, base station configurations, key pair provisioning and usage processes, messaging protocols and message formats than those described above in the context of the illustrative embodiments. These and numerous other alternative embodiments within the scope of the appended claims will be readily apparent to those skilled in the art.

We claim:
1. A method comprising:
receiving a message at a first communication network from a second communication network, wherein at least a portion of the message relates to a service level agreement between the first communication network and the second communication network; and performing an automated verification of information in the message at the first communication network to determine compliance with the service level agreement;

wherein the message receiving step is performed by a security edge protection proxy function of the first communication network and the automated verification performing step is performed by a service level agreement management function of the first communication network;

wherein the security edge protection proxy function and the service level agreement management function are executed by at least one processing device comprising a processor operatively coupled to a memory.

2. The method of claim 1, wherein the message comprises the service level agreement.

3. The method of claim 1, wherein the message comprises a cryptographic hash of the service level agreement.

4. The method of claim 1, wherein the automated verification performing step further comprises the service level agreement management function checking for a match between one or more parameters of the service level agreement and one or more preferences locally maintained at the first communication network.

5. The method of claim 4, further comprising initiating a manual verification when the automated verification fails to confirm a match between the one or more parameters and the one or more preferences.

6. The method of claim 4, wherein the one or more parameters comprise one or more of a chain of trust certificates, a DNS server list, a roaming duration parameter, a data usage parameter, an incoming call permission parameter, an outgoing call permission parameter, a messaging permission parameter, and a permissible monetary charging parameter.

7. The method of claim 1, wherein the format of the service level agreement is an XML format.

8. The method of claim 1, wherein the format of the service level agreement is a JSON format.

9. An article of manufacture comprising a non-transitory computer-readable storage medium having embodied therein executable program code that when executed by the at least one processing device causes the at least one processing device to perform the steps of claim 1.

10. Apparatus comprising at least one processor and at least one memory including computer program code, the at least one memory and the computer program code being configured to, with the at least one processor, cause the apparatus at least to:

receive a message at the first communication network from a second communication network, wherein at least a portion of the message relates to a service level agreement between the first communication network and the second communication network; and perform an automated verification of information in the message at the first communication network to determine compliance with the service level agreement;

wherein the message receiving step is performed by a security edge protection proxy function of the first communication network and the automated verification performing step is performed by a service level agreement management function of the first communication network.

11. A method comprising:

retrieving at a first communication network a service level agreement between a first communication network and a second communication network; and sending a message from the first communication network to the second communication network, wherein at least a portion of the message relates to the service level agreement between the first communication network and the second communication network, and wherein the message enables an automated verification of information in the message at the second communication network to determine compliance with the service level agreement;

wherein the service level agreement is retrieved from a service level agreement management function of the first communication network and the sending step is performed by a security edge protection proxy function of the first communication network;

wherein the security edge protection proxy function and the service level agreement management function are executed by at least one processing device comprising a processor operatively coupled to a memory.

12. The method of claim 11, wherein the message comprises the service level agreement.

13. The method of claim 11, wherein the message comprises a cryptographic hash of the service level agreement.

14. The method of claim 11, wherein the automated verification comprises checking for a match between one or more parameters of the service level agreement and one or more preferences locally maintained at the first communication network.

15. The method of claim 14, wherein the one or more parameters comprise one or more of a chain of trust certificates, a DNS server list, a roaming duration parameter, a data usage parameter, an incoming call permission parameter, an outgoing call permission parameter, a messaging permission parameter, and a permissible monetary charging parameter.

16. The method of claim 11, wherein the format of the service level agreement is an XML format.

17. The method of claim 11, wherein the format of the service level agreement is a JSON format.

18. The method of claim 11, wherein the security edge protection proxy function and the service level agreement management function are implemented in the same network entity.

19. The method of claim 11, wherein the security edge protection proxy function and the service level agreement management function are implemented in different network entities.

20. An article of manufacture comprising a non-transitory computer-readable storage medium having embodied therein executable program code that when executed by the at least one processing device causes the at least one processing device to perform the steps of claim 11.

* * * * *